US007447176B2

(12) United States Patent
Ruan et al.

(10) Patent No.: US 7,447,176 B2
(45) Date of Patent: Nov. 4, 2008

(54) MAKING ROAMING DECISIONS BASED ON ASSOCIATION QUALITIES BETWEEN WIRELESS DEVICES AND WIRELESS ACCESS POINTS

(75) Inventors: Jiandong Ruan, Bellevue, WA (US); Arun Ayyagari, Seattle, WA (US); Abhishek Abhishek, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1284 days.

(21) Appl. No.: 10/454,247

(22) Filed: Jun. 3, 2003

(65) Prior Publication Data

US 2004/0246922 A1 Dec. 9, 2004

(51) Int. Cl.
*H04Q 7/00* (2006.01)
*H04B 7/00* (2006.01)

(52) U.S. Cl. .................... 370/331; 370/332; 370/338; 455/437; 455/525; 455/41.2

(58) Field of Classification Search ............... 370/331, 370/332, 333, 338; 455/41.2, 436–440
See application file for complete search history.

(56) References Cited

U.S. PATENT DOCUMENTS

| | | | | |
|---|---|---|---|---|
| 5,815,811 A | * | 9/1998 | Pinard et al. ............... 455/434 |
| 6,327,472 B1 | * | 12/2001 | Westroos et al. ........... 455/450 |
| 6,519,248 B1 | * | 2/2003 | Valko ........................ 370/352 |
| 6,522,881 B1 | * | 2/2003 | Feder et al. ................. 455/437 |
| 6,785,254 B2 | * | 8/2004 | Korus et al. ................ 370/338 |
| 6,879,600 B1 | * | 4/2005 | Jones et al. ................. 370/466 |
| 6,940,843 B2 | * | 9/2005 | Goodall et al. ............. 370/338 |
| 7,042,988 B2 | * | 5/2006 | Juitt et al. ................. 379/88.17 |
| 2002/0035699 A1 | * | 3/2002 | Crosbie ..................... 713/201 |
| 2002/0136226 A1 | * | 9/2002 | Christoffel et al. ......... 370/401 |
| 2003/0179708 A1 | * | 9/2003 | Kamerman et al. ........ 370/241 |
| 2004/0039817 A1 | * | 2/2004 | Lee et al. ................... 709/225 |

OTHER PUBLICATIONS

Papanikos and Logothetis, A study on dynamic load balance for IEEE 802.11b wireless LAN, In Proc. COMCON, 2001.*

* cited by examiner

*Primary Examiner*—Duc M Nguyen
(74) *Attorney, Agent, or Firm*—Workman Nydegger

(57) ABSTRACT

The principles of the present invention provides for making roaming decisions based on association qualities between a wireless device and one or more wireless access points. From time to time, the wireless device updates a current association quality for a current wireless access point, for example, based on relative signal strength, observed error rates, and current wireless access point workload. Similarly, the wireless device updates association qualities for any other wireless access points the wireless device can communicate with. If the current association quality falls below a quality threshold, the wireless device roams to attempt to associate with another wireless access point. The wireless device ranks compatibly configured wireless access points based at least in part on corresponding association qualities. The wireless device can attempt to associate with higher ranked wireless access points before lower ranked wireless access points.

35 Claims, 5 Drawing Sheets

MAKING ROAMING DECISIONS BASED ON ASSOCIATION QUALITIES BETWEEN WIRELESS DEVICES AND WIRELESS ACCESS POINTS

BACKGROUND OF THE INVENTION

1. The Field of the Invention

The present invention relates to wireless networks, and more specifically, to a wireless device making roaming decisions based on association qualities between the wireless device and one or more wireless access points.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another to form both wired and wireless computer networks over which the computer systems can communicate electronically to share data. As a result, many tasks performed at a computer system (e.g., voice communication, accessing electronic mail, electronic conferencing, web browsing) include electronic communication with one or more other computer systems via wired and/or wireless computer networks.

For example, a number of computer systems can be coupled to a data hub through corresponding wired connections (e.g., category 5 cable) to form a wired network (e.g., an Ethernet segment). Similarly, a number of wireless computer systems (commonly referred to as "stations") can be coupled to a wireless access point ("AP") through corresponding wireless connections (e.g., resulting from appropriate communication between radio transmitters and receivers) to form a wireless network (e.g., an IEEE 802.11 network). Further, a data hub and/or an AP can be connected to other data hubs, APs, or other network devices, such as routers, gateways, and switches to form more complex networks (including both wired and wireless connections).

Many wireless network environments include a plurality of stationary access points that provide mobile stations with access to a wired network. A mobile station can associate with one of the access points to gain access to the resources on the wired network. For example, a mobile station can associate with an access point that provides access (potentially through one or more other wired components) to the Internet. Once associated, the mobile station and the access point can wirelessly communicate. Accordingly, the access point essentially operates as an intermediary that compatibly translates wireless communication (e.g., IEEE 802.11) into wired communication (e.g., Ethernet) and vice versa.

However, due to changed conditions, for example, when the mobile station is blocked from a current access point by physical barriers, when the current access point malfunctions, or when the mobile station moves from the vicinity/coverage of the current access point to another access point, communication between the mobile station and the current access point may be degraded or even lost Communication is lost when the signal strength of the access point drops below the receive sensitivity threshold of the mobile station's network interface and thus the mobile station can not receive packets from the current access point. The mobile station may also have a roaming threshold at or near the receive sensitivity threshold.

When signal strength drops below the roaming threshold, the mobile station may attempt to identify other access points that can provide access to the same wired network (commonly referred to as "roaming"). If other access points are identified, the mobile device can attempt to establish a new association with one of the other access points. However, aside from signal strength dropping below a roaming threshold, few, if any, other events typically cause a mobile station to roam. Thus, a mobile station may maintain an association with an access point even though communication with the access point is substantially degraded and other access points are potentially be available.

When a mobile station does roam, the mobile station typically identifies access points based almost solely on the access points being able to provide access the same wired network. However, aside from being able to provide access to the same wired network, mobile stations do not typically distinguish between access points. Accordingly, a mobile station typically does not consider the appropriateness of connections that would result from associating with different access points. For example, a mobile station may associate with an access point that provides a connection having increased latency and/or reduced bandwidth, even though other access points could provide connections with reduced latency and/or increased bandwidth. Therefore, it would be advantageous if stations determined when to roam and when to associate with an access point in a more intelligent manner.

BRIEF SUMMARY OF THE INVENTION

The foregoing problems with the prior state of the art are overcome by the principles of the present invention, which are directed towards methods, systems, computer program products, and data structures for making roaming decisions based on association qualities between a wireless device and one or more wireless access points. A wireless local area network environment includes a wireless device and a number of wireless access points. The wireless device is associated with a current wireless access point from among the plurality of wireless access points such that the wireless device communicates with the current wireless access point to access resources (files, Web pages, etc).

The wireless device calculates an association quality for the current wireless access point based on a plurality of association parameters relevant to the quality of the current association. Some association parameters can be calculated from measurements taken at the wireless device. For example, the wireless device can calculate relative signal strength and an error rate corresponding to the current wireless access point by measuring data packets received from the current wireless access point. Other association parameters can be received from a providing wireless access point (e.g., the current wireless access point).

A providing wireless access point determines resource availability for a number of different resources, such as, for example, radio frequency ("RF") resources, memory resources, and processor resources, that are potentially utilized during wireless communication with the providing wireless access point. The providing wireless access point calculates an AP availability parameter that collectively represents the availability of the number of different resources. The providing wireless access point sends a management packet (e.g., a beacon or probe response packet) that contains the AP availability parameter and that is also indicative of the corresponding signal strength of the providing wireless access point.

The wireless device determines that the association quality for the current wireless access point is insufficient, such as, for example, when the association quality for the current wireless access point drops below a specified quality threshold value. The wireless device calculates an association quality for at least one other wireless access point based on relative signal strength associated with and AP availability parameters contained in received beacon packets or probe response packets. The wireless device compares the association quality of the current wireless access point to the association quality of the at least one other wireless access point.

It may be that the wireless device maintains an access point list of wireless access points and corresponding access point association quality values. The wireless device can compare the corresponding access point association quality values to the association quality of the current wireless access point and/or the specified quality threshold value. The wireless device determines that the wireless device should attempt to associate with one of the at least one other wireless access points based on the comparison. For example, the wireless device may identify one or more other wireless access points that have a corresponding association quality above the specified quality threshold value. Accordingly, a wireless device can determine when to roam based on the quality of an association with a current wireless access point, even before signal strength drops below a roaming threshold.

The wireless device creates a candidate list containing one or more wireless access points from the access point list. The candidate list can include wireless access points that match a configuration requested by the wireless device. For example, the wireless device may request to communicate with a wireless access point that has a particular Service Set Identifier ("SSID"), that is operating in infrastructure mode, and/or that has Wired Equivalent Privacy ("WEP") encryption enabled. The wireless device generates a ranked candidate list by ranking the one or more wireless access points in the candidate list based at least in part on corresponding association quality.

The wireless device can identify any wireless access points from the candidate list that have an association quality equal to or greater than the quality threshold value (hereinafter referred to as "sufficient access points"). The wireless device can then randomly rank the sufficient access points relative to one another such that each sufficient access point is ranked differently than the other sufficient access points. This reduces thrashing and greediness since the wireless access point with the highest association quality is not always ranked first. The wireless device can then append any wireless access points from the candidate list that have an association quality less than the quality threshold value (hereinafter referred to as "insufficient access points") to the list. The wireless device can rank the insufficient access points randomly or can rank the insufficient access points based solely on association quality.

The wireless device selects a ranked wireless access point from the ranked candidate list. For example, the wireless device can select the highest ranked wireless access point from the ranked candidate list. The wireless device attempts to associate with the selected ranked wireless access point. If the wireless device can not associate with the selected ranked wireless access point, the wireless device selects another ranked wireless access point (e.g., the second highest ranked wireless access point). The wireless device then attempts to associate with the other ranked wireless access point. The wireless device can continue to select ranked wireless access points until an association is established or the ranked candidate list is exhausted. Accordingly, a wireless device associates with a wireless access point based the quality of an association with the wireless access point.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
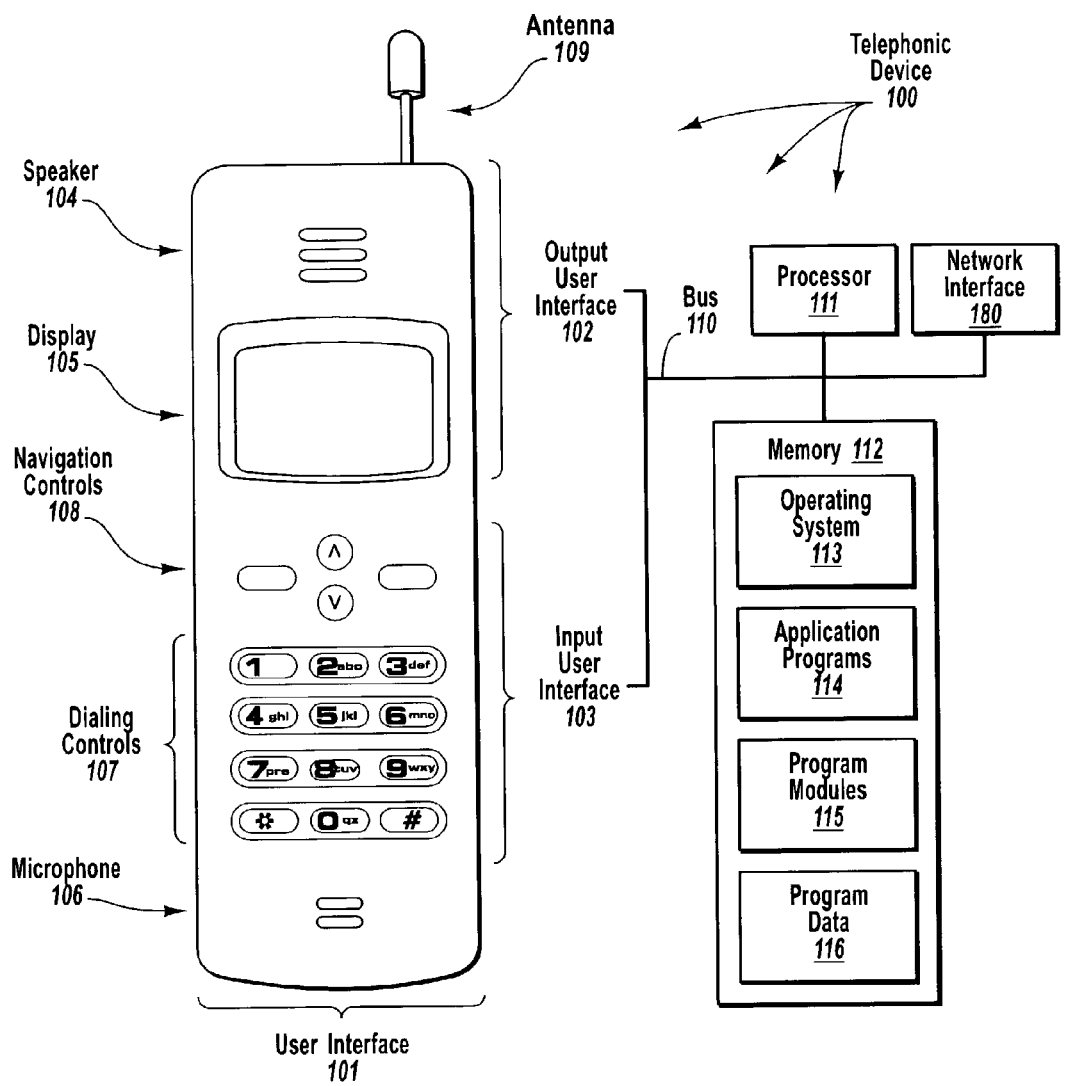
FIG. 1 illustrates a suitable operating environment for the principles of the present invention.

The principles of the present invention provides for making roaming decisions based on association qualities between a wireless device and one or more wireless access points. A wireless device is associated with a current wireless access point. From time to time, the wireless device updates a current association quality for the current wireless access point, for example, based on relative signal strength, observed error rates, and access point resource availability. The current wireless access point can provide a corresponding access point availability parameter, which represents access point resource availability in beacon and/or probe response packets. The wireless device also updates association qualities for any other access points the wireless device can communicate with. If the current association quality (i.e., the association quality with the current access point) falls below a quality threshold value, the wireless device roams to attempt to associate with another wireless access point. The wireless device ranks compatibly configured access points based at least in part on corresponding association qualities. The wireless device can attempt to associate with higher ranked access points before lower ranked access points.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable or computer-readable instructions comprise, for example, instructions and data which cause a general-purpose computer system or special-purpose computer system to perform a certain function or group of functions. The computer-executable or computer-readable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a processor and memory) work together to perform operations on electronic data.

Those skilled in the art will appreciate that the invention may be practiced in network computing environments with many types of computer system configurations, including hubs, routers, wireless access points ("APs"), wireless stations, personal computers, laptop computers, hand-held devices, multi-processor systems, microprocessor-based or programmable consumer electronics, network PCs, mini-computers, mainframe computers, mobile telephones, PDAS, pagers, and the like. The invention can also be practiced in distributed system environments where local and remote computer systems, which are linked (either by hardwired, wireless, or a combination of hardwired and wireless connections) through a network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a telephonic device 100. Telephonic device 100 includes a user interface 101 for allowing a user to input information through an input user interface 103, and review information presented at an output user interface 102. For example, the output user interface 102 includes a speaker 104 for presenting audio information to the user, as well as a display 105 for presenting visual information to the user. Although not required, telephonic device 100 may also have an antenna 109.

The input user interface 103 may include a microphone 106 for inputting audio information into telephonic device 100. In addition, the input user interface 103 includes dialing controls 107 represented by 12 buttons through which a user may enter information. Input user interface 103 also includes navigation control buttons 108 that assist the user in navigating through various entries and options listed on display 105.

Although the user interface 101 has the appearance of a mobile telephone, the unseen features of the user interface 101 may allow for complex and flexible general-purpose processing capabilities. For example, the telephonic device 100 also includes processor 111, network interface 180, and memory 112 that are connected to each other and to the user interface 101 via system bus 110. The memory 112 generally represents a wide variety of volatile and/or non-volatile memories and may include types of memory previously discussed. However, the particular type of memory used in the telephonic device 100 is not important to the present invention. Program code means comprising one or more program modules may be stored in memory 112. The one or more program modules may include an operating system 113, one or more application programs 114, other program modules 115, and program data 116.

Telephonic device 100 is connectable to networks, such as, for example, an office-wide or enterprise-wide computer network, an intranet, and/or the Internet. Telephonic device 100 can wirelessly exchange data with external sources, such as, for example, remote computer systems and/or remote databases over such a network. Telephonic device 100 includes network interface 180 that can, when appropriate, interoperate with antenna 109 to receive data from external sources and/or transmit data to external sources.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

For example, embodiments of the present invention may also be practiced with a laptop computer. The laptop computer can include a user input interface that receives information from an input device such as, for example, a keyboard, microphone, or mouse. The laptop computer can also include a video output interface that provides a video output signal to an integrated or external video display device, such as, for example, a color or monochrome computer monitor. The laptop computer can also include an audio output interface that provides an audio output signal to external audio output devices, such as, for example, speakers.

The laptop computer can also include a magnetic hard disk drive for reading from and writing to a magnetic hard disk. A magnetic hard disk drive and magnetic hard disk can provide nonvolatile storage of computer-executable instructions, data structures, program modules, and other data for the laptop computer. For example, a magnetic hard disk can store one or more program modules including an operating system, application programs, and program data.

The laptop computer can be connectable to networks, such as, for example, an office-wide or enterprise-wide computer network, an intranet, and/or the Internet. The laptop computer can wirelessly exchange data with external sources, such as, for example, remote computer systems and/or remote databases over such a network. The laptop computer can include a network interface, through which the laptop computer receives data from external sources and/or transmits data to external sources.

Modules of the present invention, as well as associated data can be stored and accessed from any of the computer-readable media associated with telephonic device 100 (or a laptop computer). For example, portions of such modules and portions of associated program data may be included in operating system 113, application programs 114, program modules 115, and/or program data 116, for storage in system memory 112. When a mass storage device, such as, for example, a magnetic hard disk, is coupled to telephonic device 100 (or a laptop computer), such modules and associated program data may also be stored at the mass storage device. In a networked environment, program modules depicted relative to telephonic device 100 (or a laptop computer), or portions thereof, can be stored in remote memory storage devices, such as, for example, system memory and/or mass storage devices associated with a remote computer system. Execution of such modules may be performed in a distributed environment as previously described.

Figure 2:
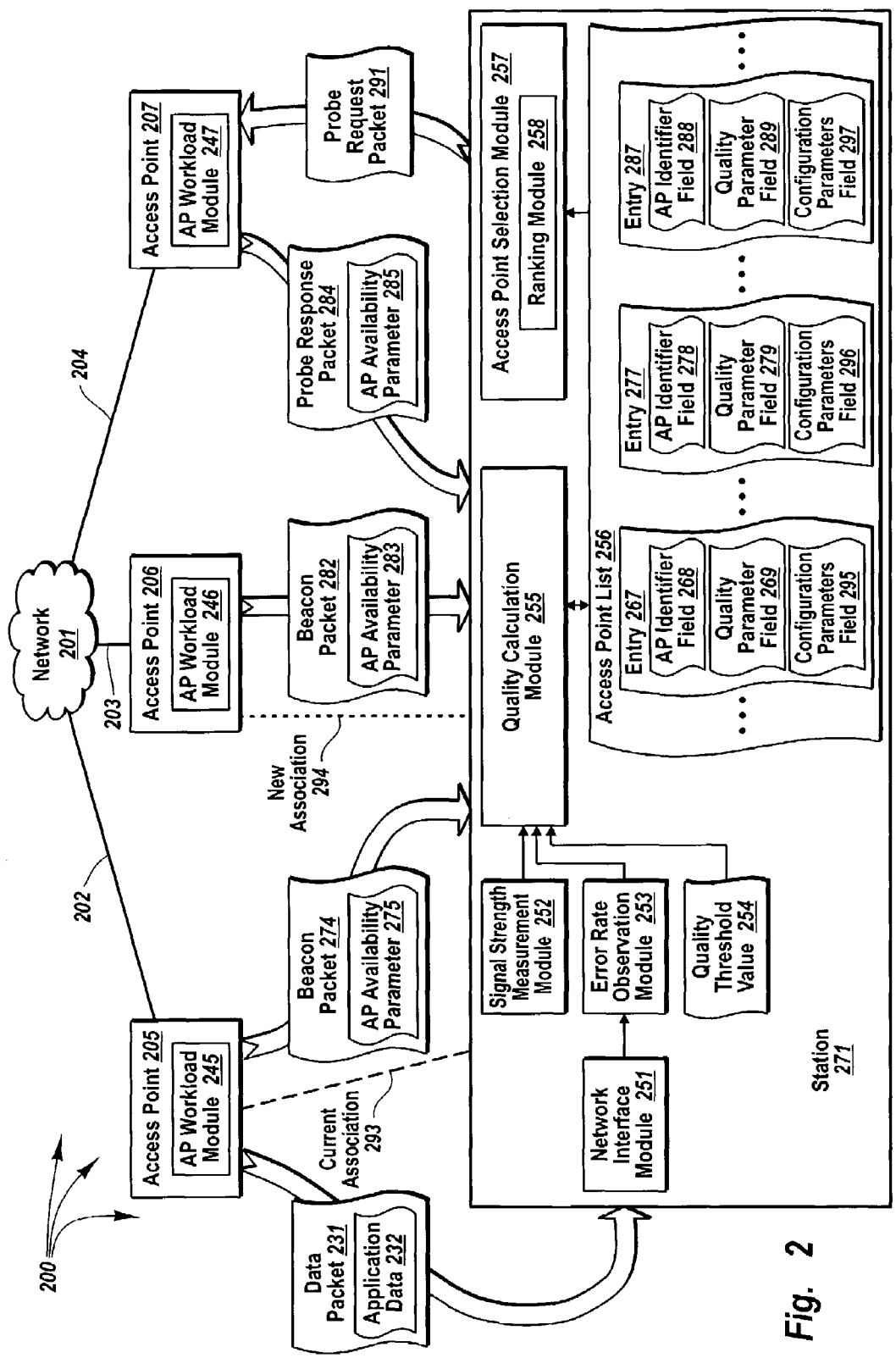
FIG. 2 illustrates an example network architecture that facilitates making roaming decisions based on an association quality between a wireless device and an access point in accordance with the principles of the present invention.

FIG. 2 illustrates an example network architecture 200 that facilitates making roaming decisions based on association qualities between a wireless device and one or more wireless access points. Network architectures 200 includes access points 205, 206 and 207 that are connected to network 201 by corresponding links 202, 203, and 204 respectively. Access points 205, 206, and 207 can be wireless access point computer systems that provide associated wireless devices with access to resources included in network 201. An access point computer system can be a special-purpose computer system that provides an interface between wireless devices and resources of a wired network. Alternatively, an access point computer system can be a general-purpose computer system provides that provides an interface between wireless devices and resources of a wired network and potentially also performs other functions not related to providing wireless devices with access to wired resources. It may be that an access point computer system occasionally provides an interface between wireless devices and resources of a wired network (as opposed to continuously providing an interface). For example, a PDA with wireless capabilities may provide an interface between wireless devices and resources of a wired network when the PDA is docked in a docking station that has a wired connection. Alternately, when the PDA is not docked in the docking station, the PDA may provide an interface between a wireless device and resources that are reachable via a wireless network.

Network 201 can be a Local Area Network ("LAN"), a Wide Area Network ("WAN"), or even the Internet. Accordingly, access points 205, 206, and 207 can forward data received from an associated wireless device to a resource in network 201. On the other hand, access points 205, 206, and 207 can also forward data received from a resource in network 201 to an associated wireless device. Network architecture 200 can include other stations (not shown) and other access points (not shown) that can each potentially communicate with station 271 and access points 205, 206, and 207.

Access points 205, 206, and 207 include AP workload modules 245, 246, and 247 respectively. Generally, an AP workload module calculates an AP availability parameter that represents the availability of a corresponding access point to wirelessly communicate. An AP workload module can measure the availability (or usage) of resources, such as, for example, radio frequency ("RF") resources, memory resources, processor resources, etc., at an access point. From the measurements, the AP workload module can calculate an AP availability parameter that collectively represents the availability of access point resources. An access point can include an AP availability parameter and one or more AP configuration parameters in a beacon packet or probe response packet that is sent to a wireless device.

Network architecture 200 also includes station 271, which can be a wireless station computer system that accesses network 201 via an associated wireless access point computer system. Station 271 includes quality calculation module 255. Quality calculation module 255 can receive one or more inputs corresponding to an association with an access point. Signal strength measurement module 252 can measure the signal strength either passively or actively. For passive measurement, for example, signal strength measurement module 252 can measure the signal strength associated with a data packet received from an access point and provide the measured signal strength to quality calculation module 255. For active measurement, for example, signal strength measurement module 252 may send a null data packet to an access point and measures the signal strength associated with the acknowledge control packet (ACK) sent back by the access point. Error rate observation module 253 can measure an error rate associated with data packets received at network interface module 251 and provide the observed error rate to quality calculation module 255. An access point can also provide an AP availability parameter to quality calculation module 255. From received inputs, quality calculation module 255 can generate an association quality for a corresponding access point.

Station 271 can maintain access point list 256, which includes entries for access points that are in communication with station 271. From time to time, station 271 can update entries for access points contained in access point list 256. Each entry in access point list 256 includes an AP identifier field, a quality parameter field, and an AP configuration parameters field. An AP identifier field can store an AP identifier value that is used by station 271 to identify an access point. An AP identifier field can store a network address value, such as, for example, a Media Access Control ("MAC") address, that is essentially unique to an access point.

A quality parameter field can store an association quality value for a corresponding access point identified by an AP identifier. For example, quality parameter field 269 can store an association quality value for the access point identified by an AP identifier stored in AP identifier field 268. An AP configuration parameters field can store AP configuration parameter values (e.g., Basic Service Set ("BSS") Type, Service Set Identifiers ("SSIDs"), supported data rates, privacy settings, etc.) for a corresponding access point identified by an AP identifier. For example, AP configuration parameters field 295 can store configuration parameter values for the access point identified by an AP identifier stored in AP identifier field 268. A series of three periods (i.e., an ellipsis) within access point list 256 indicates that other entries may be included between the depicted entries.

Station 271 also includes access point selection module 257, which can identify an access point that station 271 should attempt to associate with (e.g., when station 271 is roaming). Access point selection module 257 can retrieve entries from access point list 256. Based on association quality values and AP configuration values in retrieved entries, access point selection module 257 can determine if any access points are suitable for association with station 271. Ranking module 258 can rank suitable entries based at least in part on association quality values. Ranking module 258 can also use random multipliers to reduce the chance of access points with higher association qualities always being ranked higher. Accordingly, both thrashing between access points and greediness can be reduced.

As represented by current association 293 (the dashed line), station 271 is currently associated with access point 205. Thus, station 271 communicates with resources included in network 201 through access point 205 and resources included in network 201 communicate with station 271 through access point 205. Accordingly, data packets containing application data (Web pages, electronic mail messages, etc.) can be transferred between station 271 and access point 205. For example, data packet 231, which contains application data 232, is transferred from access point 205 to station 271.

Figure 3:
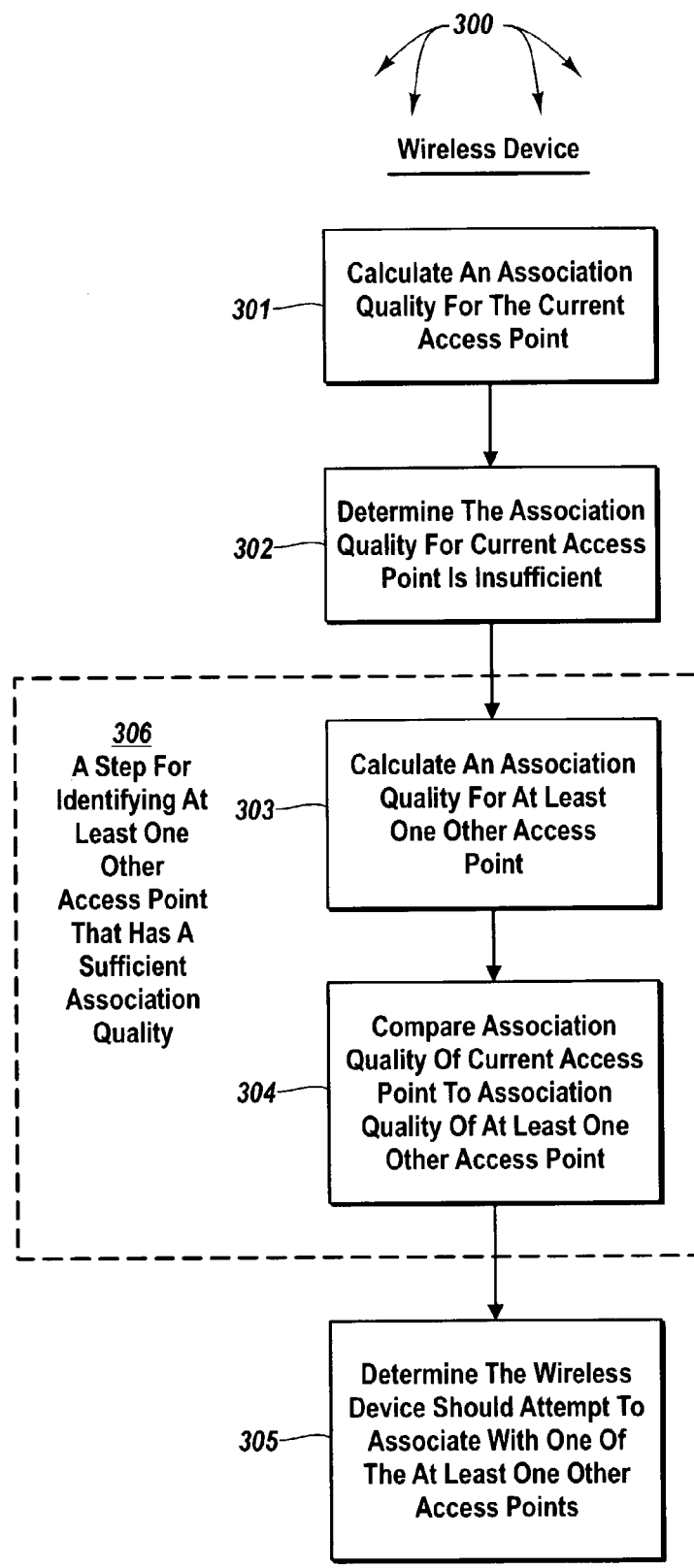
FIG. 3 illustrates an example flowchart of a method for determining whether a wireless device should roam in accordance with the principles of the present invention.

FIG. 3 illustrates an example flowchart of a method 300 for determining whether a wireless device should roam in accordance with the principles of the present invention. The method 300 will be discussed with respect to the station and access points depicted in network architecture 200. The method 300 includes an act of calculating an association quality for the current access point (act 301). Act 301 can include a wireless device calculating an association quality for a current wireless access point based on a plurality of parameters relevant to the quality the current association. For example, station 271 can calculate an association quality for access point 205 based on parameters relevant to the quality of current association 293. Some parameters may be generated at station 271, while others are received from access points.

For example, signal strength measurement module 252 can measure the signal strength associated with packets, such as, for example, data packet 231 and beacon packet 274, received from access point 205. Signal strength measurement module 252 can measure the energy at an antenna utilized by station 271 to receive packets. Absolute signal strength, measured in milliwatts ("mW") or decibel milliwatts ("dBm"), may be specific to the data rate at which a packet is received. Thus, a comparison of absolute signal strength values for different data rates may not have significant meaning. For example, comparing an absolute signal strength measured for data transferred at 2 Megabits per second ("Mbps") to an absolute signal strength measured for data transferred to 5.5 Megabits per second ("Mbps") may not have significant meaning.

Accordingly, absolute signal strengths can be normalized such that signal strength values of different data rates can be meaningfully compared. A Received Signal Strength Indicator ("RSSI") is a relative measurement that can be used to compare signal strengths for different data rates. Signal strength measurement module 252 can provide normalized values, such as, for example, RSSIs, to quality calculation module 252.

Further, error rate observation module 253 can observe error rates for data packets received from a current access point, such as, for example, access point 205. Network interface module 251 can generate error rate statistics as data packets are received from a current access point, such as, for example, from access point 205. Error rate observation module 253 can query network interface module 251 for error rate statistics corresponding to the current access point and can provide queried error rate statistics to quality calculation module 255.

Figure 5:
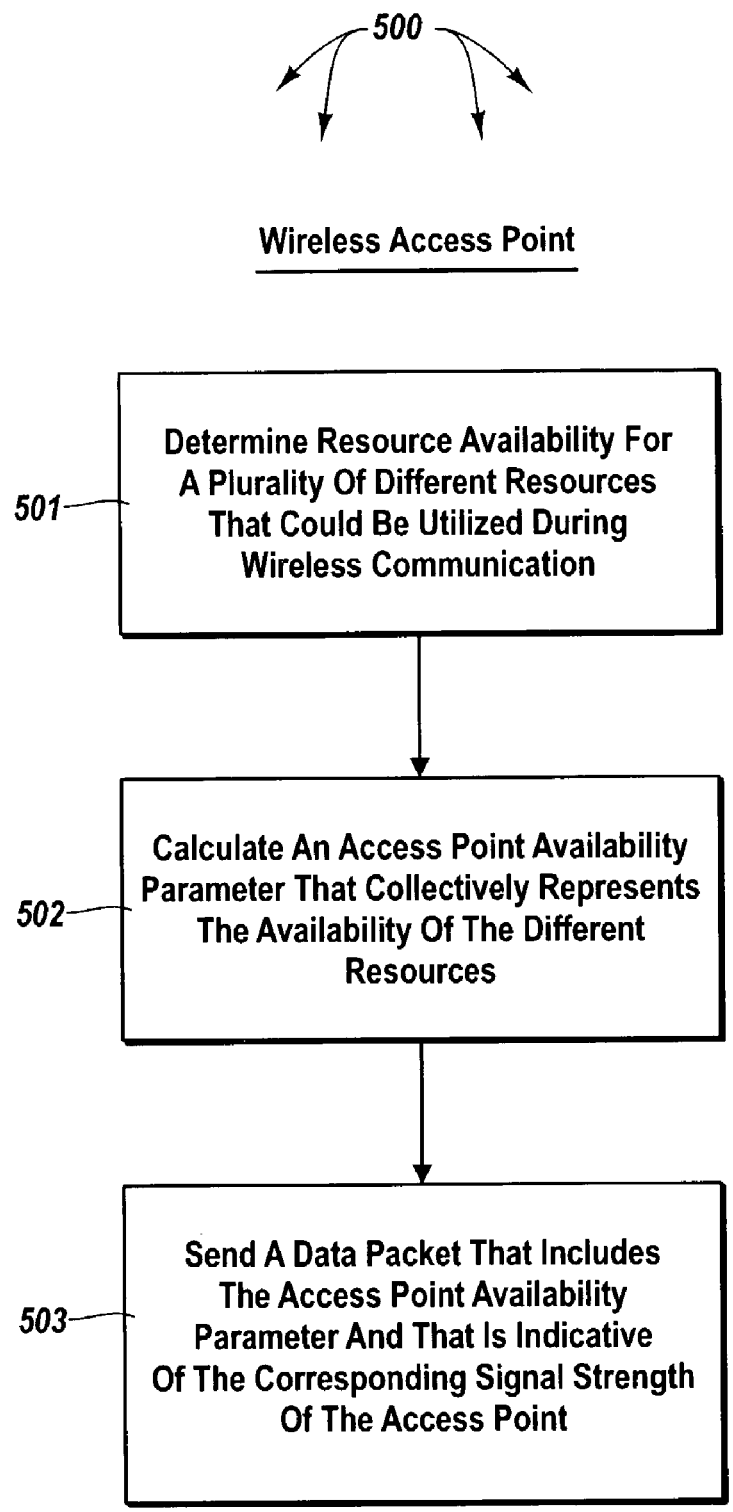
FIG. 5 illustrates an example flowchart of a method for indicating the availability of an access point to wirelessly communicate with a wireless device in accordance with the principles of the present invention.

Access point 205 can also provide an AP availability parameter and one or more AP configuration parameters to station 271. Referring now to FIG. 5, FIG. 5 illustrates an example flowchart of a method 500 for indicating the availability of an access point to wirelessly communicate with a wireless device in accordance with the principles of the present invention. The method 500 will be discussed with respect to the station and access points depicted in network architecture 200. The method 500 includes an act of determining resource availability for a plurality of different resources that could be utilized during wireless communication (act 501). Act 501 can include a providing wireless access point determining resource availability for a plurality of different resources that are potentially utilized during wireless communication with a wireless device.

For example, access point 205 can determine the availability of resources that are potentially utilized when wirelessly communicating with station 271. AP workload module 245 can make appropriate availability measurements to determine availability values for resources. For example, AP workload module 245 can measure RF usage of the underlying wireless channel (e.g., an IEEE 802.11 channel in the 2.4 GHz or 5 GHz spectrum) currently being utilized by access point 205. From measured RF usage, AP workload module 245 can calculate an RF availability value (a percentage or an absolute value) that represents available RF resources (e.g., by subtracting RF usage from total available RF resources).

AP workload module 245 can also measure memory usage of access point 205. From measured memory usage, AP workload module 245 can calculate a memory availability value (a percentage or an absolute value) that represents available memory resources. AP workload module 245 can also measure processor usage of access point 205. From measured processor usage, AP workload module 245 can calculate a processor availability value (a percentage or an absolute value) that represents available processor resources. AP workload module 245 can calculate the availability of other resources in a similar manner.

Still referring to FIG. 5, the method 500 includes an act of calculating an access point availability parameter that collectively represents the availability of access point resources (act 502). Act 502 can include a providing access point calculating an access point availability parameter that collectively represents the availability of the providing wireless access point's different resources. For example, AP workload module 245 can calculate AP availability parameter 275 that collectively represents the availability of RF resources, memory resources, and processor resources at access point 205.

AP workload module 245 can calculate AP availability parameter 275 based on weighted values. When the availability of a particular resource has increased importance, AP workload module 245 can weight the corresponding value so that the corresponding value has an increased affect on an access point availability parameter. For example, when RF resources at access point 205 have increased importance, an RF availability value can be weighted to have an increased affect on AP availability parameter 275. On the other hand, when the availability of a particular resource has decreased importance, AP workload module 245 can weight the corresponding value so that the corresponding value has a reduced affect on an access point availability parameter. For example, when processor resources at access point 205 have decreased importance, a processor availability value can be weighted to have a reduced affect on AP availability parameter 275.

Still referring to FIG. 5, the method 500 includes an act of sending a data packet that includes the access point availability parameter and that is indicative of the corresponding signal strength of the access point (act 503). Act 503 can include a providing wireless access point sending a management packet that includes the access point availability parameter (and potentially one or more AP configuration parameters) to a wireless device, the data packet also being indicative of the corresponding signal strength of the providing wireless access point. For example, access point 205 can send beacon packet 274, which includes AP availability parameter 275, to station 271. From beacon packet 274, signal strength measurement module 252 can measure the signal strength associated with access point 205.

Based on received signal strength measurements, error rate observations, and an AP availability parameter, quality calculation module 255 can calculate a current association quality value for access point 205. Quality calculation module 255 can store the current association quality value in an entry of access point list 256. For example, it may be that entry 267 corresponds to access point 205. Accordingly, an AP identifier identifying access point 205 may be stored in AP identifier field 268 and AP configuration parameter values for access point 205 may be stored in AP configuration parameters field 295. When a current quality association value is calculated for access point 205, the current quality association value can be stored in quality parameter field 269 (potentially overwriting a previously calculated quality association value). Since quality association values are calculated from a plurality of relevant measurements, a wireless device can make more intelligent roaming decisions.

Returning back to FIG. 3, the method 300 includes an act of determining the association quality for the current access point is insufficient (act 302). Act 302 can include the wireless device determining that the association quality for the current wireless access point is insufficient. For example, station 271 can determine that the association quality value for access point 205 is insufficient. Quality calculation module 255 can retrieve a current quality association value corresponding to access point 205 (e.g., stored in quality parameter field 269) from access point list 256. Alternately, quality calculation module 255 may use a recently calculated current quality association value that has not yet been stored in access point list 256.

Quality calculation module 255 compares the current quality association value to quality threshold value 254. When the retrieved current quality association value is greater than or equal to quality threshold value 254, current association 293 is viewed as being sufficient. When current association 293 is sufficient, station 271 can maintain current association 293, even if associations with other access points might provide increased association quality. Accordingly, the greediness of station 271 is potentially reduced. That is, station 271 does not always attempt to associate with an access point having increased association quality.

On the other hand, when the current quality association value is less than quality threshold value 254, current association 293 is viewed as being insufficient. When current association 293 is insufficient, station 271 may roam to attempt to associate with a different access point. A quality threshold value is configurable such that a user or system administrator can set a desired quality threshold to appropriately suit particular network environments.

The method 300 includes a functional, result-oriented step for identifying a least one other wireless access point that has a sufficient association quality (step 306). Step 306 can include any corresponding acts for identifying a least one other access point that has a sufficient association quality. However, in the illustrated example of FIG. 3, step 306 includes a corresponding act of calculating an association quality for at least one other access point (act 303.) Act 303 can include the wireless device calculating an association quality for at least one of the other wireless access points included in the plurality of wireless access points.

For example, station 271 can calculate association quality values for other access points in network architecture 200, such as, for example, access points 206 and 207. Station 271 can receive beacon and/or probe response packets that contain AP availability parameters (and potentially one or more AP configuration parameters) from other access points. Upon receiving beacon and/or probe response packets, signal strength measurement module 252 can measure a signal strength associated with the received beacon and/or probe response packets. For example, signal strength measurement module 252 can measure the signal strength associated with access point 206 when beacon packet 282 is received at station 271. Accordingly, beacon packet 282 may provide station 271 with all the information for calculating an association quality value for access point 206.

Access points can be configured to automatically send beacon packets at specified intervals. As beacon packets are received from an access point, quality calculation module 255 can calculate a new quality association value for the access point. Quality calculation module 255 can update entries in access point list 256 by storing new quality association values in corresponding quality parameter fields. For example, it may be that entry 277 corresponds to access point 206. Accordingly, an AP identifier identifying access point 206 may be stored in AP identifier field 278 and AP configuration parameters for access point 206 may be stored in AP configuration parameters field 296. When a new association quality value is calculated for access point 206, the new quality association value can be stored in quality parameter field 279 (potentially overwriting a previously calculated quality association value).

It may be that station 271 is to calculate an association quality value for an access point at some time between beacon packets. Accordingly, station 271 can send a probe request packet to an access point to request an AP availability parameter. For example, station 271 can send probe request packet 291 to access point 207. In response, access point 207 can send probe response packet 284, which contains AP availability parameter 286 (and potentially one or more AP configuration parameters), back to station 271. Signal strength measurement module 252 can measure the signal strength associated with access point 207 when probe response packet 284 is received at station 271. Accordingly, probe request packet 284 may provide station 271 with all the information for calculating an association quality value for access point 206.

Quality calculation module 255 can calculate a new quality association value for access point 207. Quality calculation module 255 can update an entry in access point list 256 by storing a new quality association value in a corresponding quality parameter field. For example, it may be that entry 287 corresponds to access point 207. Accordingly, an AP identifier identifying access point 207 may be stored in AP identifier field 288 and AP configuration parameters for access point 207 may be stored in AP configuration parameters field 297. When a new quality association value is calculated for access point 207, the new quality association value can be stored in quality parameter field 289 (potentially overwriting a previously calculated quality association value).

The step 306 also includes a corresponding act of comparing association quality of the current access point to the association quality of at least one other access point (act 304). Act 304 can include the wireless device comparing the association quality of the current wireless access point to the association quality of the at least one of the other wireless access points. For example, station 271 can compare the association quality of access point 205 to the association qualities of access points 206 and 207. Quality calculation module 255 can retrieve appropriate quality association values from access point list 256 and compare the values.

Based on association quality value comparisons, station 271 may determine that station 271 should not attempt to associate with a different access point. For example, it may be that no other access point has an association quality value greater than the association quality value for access point 205. Accordingly, station 271 may maintain current association 293 (even if current association 293 is insufficient) when no other access points could provide increased quality.

On the other hand, station 271 may determine that station 271 should attempt to associate with a different access point. The method 300 includes an act of determining that the wireless device should attempt to associate with one of the at least one other access points (act 305). Act 305 can include the wireless device determining that the wireless device should attempt to associate with one of the at least one of the other wireless access points based on the comparison. For example, based on comparisons of quality association values for access points 205, 206, and 207, station 271 may determine that station 271 should attempt to associate with an access point other than access point 205. Station 271 may make such a determination when the association quality value for access point 205 is less than the association quality value for access point 206 and/or access point 207. Accordingly, station 271 can roam to attempt to identify a new access point that can provide increased quality.

Figure 4:
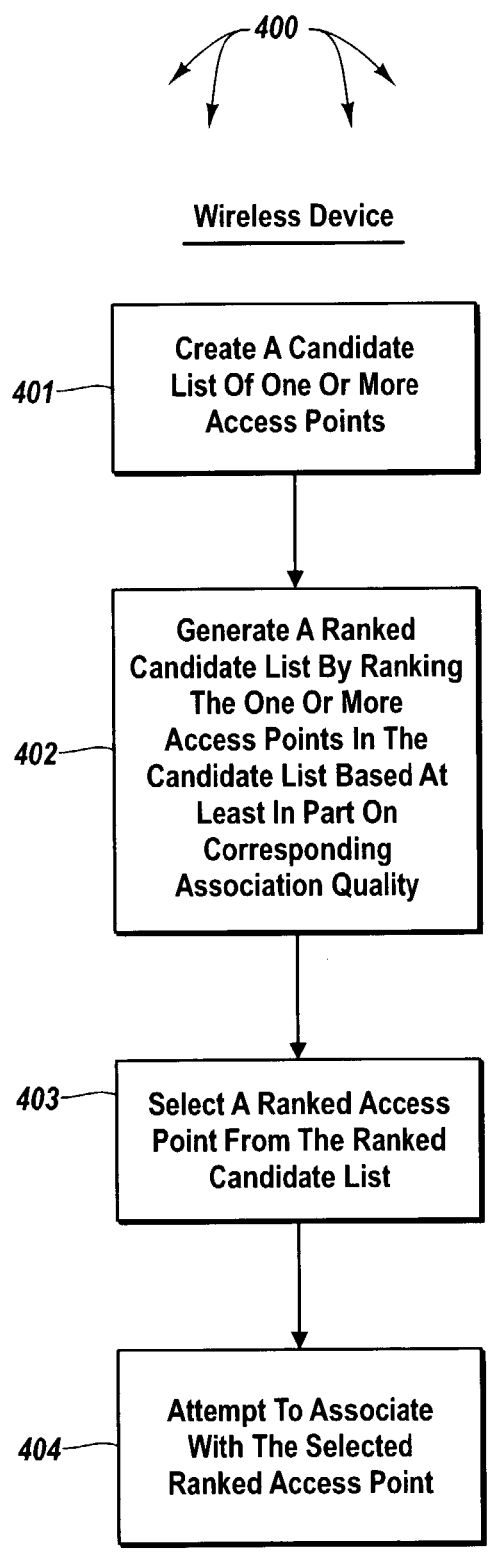
FIG. 4 illustrates an example flowchart of a method for identifying a new access point for a wireless device to attempt to associate with in accordance with the principles of the present invention.

FIG. 4 illustrates an example flowchart of a method 400 for identifying a new access point for a wireless device to attempt to associate with in accordance with the principles of the present invention. The method 400 will be discussed with respect to the station and access points depicted in network architecture 200.

The method 400 includes an act of creating a candidate list of one or more access points (act 401). Act 401 can include a wireless device creating a candidate list of one or more wireless access points from among a plurality of wireless access points. For example, access point selection module 257 can create a candidate list of one or more wireless access points from network architecture 200, such as, for example, access points 205, 206, and 207. Access point selection module 257 can create a candidate list based on the configuration of access points.

Access point selection module 257 can check AP configuration parameter values (e.g., previously received in beacon and/or probe response packets) stored in AP configuration parameters fields to identify access points that are appropriately configured for communicating with station 271. When an appropriately configured access point is identified, the access point can be selected for inclusion in the candidate list. For example, access point selection module 257 may check configuration parameter values contained in configuration parameters field 279 to determine if access point 206 is appropriately configured for communicating with station 271.

Configuration parameters can include BSS type, such as, for example, independent or infrastructure mode, SSID, basic service set identifier ("BSSID"), supported data rate set, privacy settings (e.g., support for Wired Equivalent Privacy ("WEP") encryption), short preamble requirement, modulation requirement, channel agility requirement. Access point selection module 257 can identify access points matching a configuration that promotes appropriate communication with station 271. For example, access point selection module 257 can identify one or more access points that match a requested data rate and privacy setting for station 271. Access point selection module 257 can select the one or more identified access points for inclusion in the candidate list.

Access point selection module 257 does not select access points that are not appropriately configured to communicate with station 271. For example, when station 271 does not support short preamble matching, desired modulation, or channel agility, access point selection module 257 does not select access points that require those features. Matching SSIDs and BSSIDs can include byte for byte comparisons to determine if a requested SSID or BSSID matches an SSID or BSSID advertised by an access point. For example, access point selection module 257 can compare an SSID requested by station 271 to an SSID advertised by access point 207 (e.g., stored in AP configuration parameters field 297). When the SSID matches, access point selection module 257 may select access point 207 for inclusion in the candidate list. On the other hand, when the SSID does not match, access point selection module 257 does not select access point 207 for inclusion in the candidate list.

The method 400 includes an act of generating a ranked candidate list by ranking the one or more wireless access points in the candidate list (act 402). Act 402 can include the wireless device generating a ranked candidate list by assigning a corresponding rank to each wireless access point in the candidate list. For example, ranking module 258 can assign corresponding ranks to access points 205, 206, and 207. A corresponding rank for each wireless access point can be calculated at least in part based on an association quality between a wireless access point and a wireless device.

For example, access point selection module 257 can identify any access points from among access points 205, 206, and 207 that have an association quality value equal to or greater than the quality threshold value (hereinafter referred to as "sufficient access points"). Ranking module 258 can then randomly rank the sufficient access points relative to one another such that each sufficient access point is ranked differently than the other sufficient access points. Ranking module 258 can arrange the sufficient access points in a ranked candidate list based on rank. This reduces thrashing and greediness since, due to the randomness, the access point with the highest association quality value is not always ranked first.

Ranking module 258 can then append any access points from among access points 205, 206, and 207 that have an association quality value less than the quality threshold value (hereinafter referred to as "insufficient access points") to the ranked candidate list. Ranking module 258 can rank the insufficient access points randomly or can rank the insufficient access points based solely on association quality. However, it may be that the lowest ranked sufficient access point is ranked higher than the highest ranked insufficient access point. Thus, there is an increased likelihood of station 271 becoming associated with a sufficient access point.

In some embodiments, sufficient access points are included in a sufficient candidate sub-list and insufficient access points are included in an in insufficient candidate sub-list. Equation 1 can be used to appropriately weight sufficient access points included in a sufficient candidate sub-list in accordance with the principles of the present invention.

$$W_i = \frac{(Q_i - DesiredQualityThreshold + c)}{\sum_i (Q_i - DesiredQualityThreshold + c)} \quad \text{EQUATION 1}$$

Within Equation 1, i is i-th (i=1, 2, ..., n) access point in the sufficient candidate sub-list, $Q_i$ is the association quality value for the i-th access point, c is a constant. The constant c gives access points with lower association quality values some chance to be placed higher in a ranked candidate list. For each access point, W equals a representative fraction of the sum of all calculated values. For example, it may be that DesriredQualityThreshold has a value of 4 and c has a value of 2. Further, access point 205 (a first access point, i=1) may have a Q value 5, access point 206 (a second access point, i=2) may have a Q value 9, and access point 207 (a third access point, i=3) may have a Q value 7. Accordingly, access point 205 would have a $W_1$ value of 3/15, access point 205 would have a $W_2$ value of 7/15, and access point 205 would have a $W_3$ value of 5/15

Equation 2 can be used to appropriately assign a probability for each weighted sufficient access point in accordance with the principles of the present invention.

$$P_0 = 0 \quad \text{EQUATION 2}$$
$$P_i = \sum_{k=1}^{i} W_k$$

Referring to the immediate preceding example involving access points 205, 206, and 207, access point 205 would have a $P_1$ value of 3/15 (i.e., $W_1$), access point 206 would have a $P_2$ value of 10/15 (i.e., $W_1+W_2$), and access point 207 would have a $P_3$ value of 15/15 (i.e., $W_1+W_2+W_3$). A uniform distributed random number r, between 0 and 1 is generated for each access point. When $P_{i-1} \leq r < P_i$, the i-th access point is moved to a ranked list access points. For example, a random number of 0.5 would result in access point 206 (the second access point, i=2) being moved to a ranked list of access points. That is, $3/15 \leq 0.5 < 10/15$.

After the sufficient access points are included in the ranked candidate list, any insufficient access points can be appended to the ranked candidate list. The method 400 includes an act of selecting a ranked access point from the ranked candidate list (act 403). Act 403 can include the wireless access point selecting a ranked wireless access point from the ranked candidate list. For example, access point selection module 257 can select a ranked access point from the ranked candidate list for station 271. It may be that access point selection module 257 selects a highest ranked access point first.

The method 400 includes an act of attempting to associate with the selected ranked access point (act 404). Act 404 can include the wireless device attempting to associate with the selected ranked wireless access point. For example, station 271 can attempt to associate with access point 206. When the association is successful, new association 294 (the dotted line) is established. Station 271 then communicates with resources included in network 201 through access point 206.

If the station 271 can not associate with the selected ranked access point, station 271 selects another ranked access points (e.g., the second highest ranked access point). Station 271 then attempts to associate with the other ranked access point. For example, if station 217 is unable to associate with access point 206, station 217 can then attempt to associate with access point 207. Station 271 can continue to select ranked access points until an association is established (which may result in a current association being maintained). Accordingly, a wireless device associates with a new wireless access point in an intelligent manner that reduces thrashing and greediness.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. At a wireless device in a wireless local area network environment that includes a plurality of wireless access points and a wireless device that is currently associated with a current wireless access point from among the plurality of wireless access points, a method for determining whether the wireless device should roam to associate with another of the wireless access points, the method comprising the following performed by the wireless device:

an act of calculating an association quality for the current wireless access point based on a plurality of parameters relevant to the quality of the current association including received signal strength measurements, error rate observations, and an access point availability parameter;

an act of determining that the association quality for the current wireless access point is insufficient, the determination indicating that the association quality is below a user-defined threshold association quality value which indicates a level of quality at which the wireless device attempts to roam to a different wireless access point;

an act of calculating an association quality for at least one of the other wireless access points of the plurality of wireless access points based on a plurality of parameters relevant to the quality of at least one of the other wireless access points including received signal strength measurements, error rate observations, and an access point availability parameter;

an act of comparing the association quality of the current wireless access point to the association quality of the at least one of the other wireless access points to determine which of the at least one other wireless access points is optimal based on a weighting of the plurality of parameters; and an act of determining that the wireless device should attempt to associate with the determined optimal other wireless access point.

2. The method as recited in claim 1, wherein the act of calculating an association quality for the current wireless access point comprises an act of calculating an association quality based on the signal strength of the current wireless access point.

3. The method as recited in claim 1, wherein the act of calculating an association quality for the current wireless access point comprises an act of calculating an association quality based on the available resources at the current wireless access point.

4. The method as recited in claim 3, wherein an act of calculating an association quality based on the availability resources at the current wireless access point comprises an act of calculating an association quality based on radio frequency availability.

5. The method as recited in claim 3, wherein an act of calculating an association quality based on the availability resources at the current wireless access point comprises an act of calculating an association quality based on processor availability.

6. The method as recited in claim 3, wherein an act of calculating an association quality based on the availability resources at the current wireless access point comprises an act of calculating an association quality based on memory availability.

7. The method as recited in claim 3, wherein an act of calculating an association quality based on the availability resources at the current wireless access point comprises an act of calculating an association quality based on an access point availability parameter that collectively represents the availability of a plurality of different wireless access point resources.

8. The method as recited in claim 1, wherein the act of calculating an association quality for the current wireless access point comprises an act of calculating an association quality based an error rate of data packets sent from the current wireless access point.

9. The method as recited in claim 1, wherein the act of determining that the association quality for the current wireless access point is insufficient comprises an act of detecting that the association quality for the current wireless access point is below a quality threshold value.

10. The method as recited in claim 1, wherein the act of calculating an association quality for at least one of the other wireless access points of the plurality of wireless access points comprises an act of calculating an association quality for at least one of the other wireless access points based on the on the available resources at the at least one of the other wireless access points.

11. The method as recited in claim 1, wherein the act of calculating an association quality for at least one of the other wireless access points of the plurality of wireless access points comprises an act of calculating an association quality for at least one of the other wireless access points based on the on the signal strength of the at least one of the other wireless access points.

12. The method as recited in claim 1, wherein the act of comparing the association quality of the current wireless access point to the association quality of the at least one of the other wireless access points comprises an act of comparing an association quality value for the current wireless access points to an association quality value for at least one of the other wireless access points.

13. The method as recited in claim 1, wherein the act of determining that the wireless device should attempt to associate with one of the at least one of the other wireless access points comprises an act of the wireless device roaming.

14. The method as recited in claim 1, further comprising:
an act of storing the calculated association quality for the current wireless access point in a corresponding entry of an access point list.

15. The method as recited in claim 1, further comprising:
an act of storing the calculated association qualities for the at least one of the other wireless access point in corresponding entries of an access point list.

16. The method as recited in claim 1, further comprising:
an act of receiving a packet from the current wireless access point that includes an access point availability parameter.

17. The method as recited in claim 16, wherein the act of receiving a packet from the current wireless access point that includes an access point availability parameter comprises an act of receiving a packet that includes one or more access point configuration parameters.

18. At a wireless device, in a wireless local area network environment that includes a plurality of wireless access points and a wireless device that is currently associated with a current wireless access point from among the plurality of wireless access points, a method for determining whether the wireless device should roam to associate with another of the wireless access points, the method comprising the following performed by the wireless device:
an act of calculating an association quality for the current wireless access point based on a plurality of parameters relevant to the quality of the current association including received signal strength measurements, error rate observations, and an access point availability parameter;
an act of determining that the association quality for the current wireless access point is insufficient, the determination indicating that the association quality is below a user-defined threshold association quality value which indicates a level of quality at which the wireless device attempts to roam to a different wireless access point;
a step for identifying that at least one of the other wireless access points has a sufficient association quality based on a plurality of parameters relevant to the quality of at least one of the other wireless access points including received signal strength measurements, error rate observations, and an access point availability parameter;
an act of determining that the wireless device should attempt to associate with the determined optimal other wireless access points.

19. In a wireless local area network environment that includes a plurality of wireless access points and a wireless device that is associated with a current access point from among the plurality of wireless access points, a method for identifying a new access point for the wireless device to attempt to associate with when the association quality for the current access point is insufficient, the method comprising the following performed by the wireless device:
an act of creating a candidate list of one or more wireless access points from among the plurality of wireless access points, the candidate list including wireless access points that have a configuration appropriate for communicating with the wireless device;
an act of generating a ranked candidate list by assigning a corresponding rank to each wireless access point in the candidate list, the corresponding rank for each wireless access point being calculated at least in part based on an association quality between the access point and the wireless device, the association quality being based on a plurality of parameters relevant to the quality of at least one of the other wireless access points including received signal strength measurements, error rate observations, and an access point availability parameter;
an act of determining that the association quality for the current wireless access point is insufficient, the determination indicating that the association quality is below a user-defined threshold association quality value which indicates a level of quality at which the wireless device attempts to roam to a different wireless access point;

an act of selecting a ranked wireless access point from the ranked candidate list; and an act of attempting to associate with the selected ranked wireless access point.

20. The method as recited in claim 19, wherein the act of creating a candidate list of one or more wireless access points from among the plurality of wireless access points comprises an act of identifying wireless access points that are operating in infrastructure mode.

21. The method as recited in claim 19, wherein the act of creating a candidate list of one or more wireless access points from among the plurality of wireless access points comprises an act of identifying wireless access points having a service set identifier matching a service set identifier requested by the wireless device.

22. The method as recited in claim 19, wherein the act of creating a candidate list of one or more wireless access points from among the plurality of wireless access points comprises an act of identifying wireless access points having a data rate value matching a data rate value requested by the wireless device.

23. The method as recited in claim 19, wherein the act of creating a candidate list of one or more wireless access points from among the plurality of wireless access points comprises an act of identifying wireless access points having a privacy settings matching that match privacy settings requested by the wireless device.

24. The method as recited in claim 23, wherein the act of identifying wireless access points having a privacy settings matching that match privacy settings requested by the wireless device comprise an act of identifying a wireless access point that supports Wired Equivalent Privacy encryption.

25. The method as recited in claim 19, wherein the act of creating a candidate list of one or more wireless access points from among the plurality of wireless access points comprises an act of retrieving one or more entries from an access points list.

26. The method as recited in claim 19, wherein the act of generating a ranked candidate list by assigning a corresponding rank to each wireless access point in the candidate list comprises an act of identifying wireless access points that have a corresponding association quality above a quality threshold value.

27. The method as recited in claim 19, wherein the act of generating a ranked candidate list by assigning a corresponding rank to each wireless access point in the candidate list comprises an act of randomly assigning ranks to wireless access points having a corresponding association quality above a quality threshold value.

28. The method as recited in claim 19, wherein the act of selecting a ranked wireless access point from the ranked candidate list comprises an act of selecting the highest ranked wireless access point.

29. The method as recited in claim 19, wherein the act of attempting to associate with the selected ranked wireless access point comprises an act of wirelessly communicating with the selected ranked wireless access point.

30. The method as recited in claim 19, further comprising:
an act of retrieving association qualities for wireless access points from corresponding entries in an access point list.

31. A computer-readable medium storing a computer program for use at a wireless device in a wireless local area network environment that includes a plurality of wireless access points and a wireless device that is currently associated with a current wireless access point from among the plurality of wireless access points, the computer program implementing a method for determining whether the wireless device should roam to associate with another of the wireless access points, the computer program comprising one or more computer executable instructions that, when executed by a processor, cause the wireless device to perform the following:

calculate an association quality for the current wireless access point based on a plurality of parameters relevant to the quality of the current association including received signal strength measurements, error rate observations, and an access point availability parameter;

determine that the association quality for the current wireless access point is insufficient, the determination indicating that the association quality is below a user-defined threshold association quality value which indicates a level of quality at which the wireless device attempts to roam to a different wireless access point;

calculate an association quality for at least one of the other wireless access points of the plurality of wireless access points based on a plurality of parameters relevant to the quality of at least one of the other wireless access points including received signal strength measurements, error rate observations, and an access point availability parameter;

compare the association quality of the current wireless access point to the association quality of the at least one of the other wireless access points to determine which of the at least one other wireless access points is optimal based on a weighting of the plurality of parameters; and determine that the wireless device should attempt to associate with the determined optimal other wireless access point.

32. The computer-readable medium storing a computer program as recited in claim 31, wherein the one or more computer-readable media include system memory.

33. A computer-readable medium storing a computer program for use in a wireless local area network environment that includes a plurality of wireless access points and a wireless device that is associated with a current access point from among the plurality of wireless access points, the computer program product for implementing a method for identifying a new access point for the wireless device to attempt to associate with when the association quality for the current access point is insufficient, the computer program product comprising one or more computer-readable media having stored thereon computer executable instructions that, when executed by a processor, cause the wireless device to perform the following:

create a candidate list of one or more wireless access points from among the plurality of wireless access points, the candidate list including wireless access points that have a configuration appropriate for communicating with the wireless device;

generate a ranked candidate list by assigning a corresponding rank to each wireless access point in the candidate list, the corresponding rank for each wireless access point being calculated at least in part based on an association quality between the access point and the wireless device, the association quality being based on a plurality of parameters relevant to the quality of at least one of the other wireless access points including received signal strength measurements, error rate observations, and an access point availability parameter;

an act of determining that the association quality for the current wireless access point is insufficient, the determination indicating that the association quality is below a user-defined threshold association quality value which indicates a level of quality at which the wireless device attempts to roam to a different wireless access point;

select a ranked wireless access point from the ranked candidate list; and attempt to associate with the selected ranked wireless access point.

34. The computer-readable medium storing a computer program as recited in claim 33, wherein the one or more computer-readable media include system memory.

35. In a wireless device, one or more computer-readable media having stored thereon a data structure for representing an entry in an access point list, the data structure comprising the following:

an access point identifier field representing an access point identifier for identifying a wireless access point that can wirelessly communicate with the wireless device;

a quality parameter field representing an association quality value that indicates the association quality between the wireless device and the wireless access point identified in the access point identifier field, the association quality being based on a plurality of parameters relevant to the quality of the current association including received signal strength measurements, error rate observations, and an access point availability parameter, the quality parameter field indicating that the association quality is below a user-defined threshold association quality value which indicates a level of quality at which the wireless device attempts to roam to a different wireless access point; and an AP configuration parameters field representing one or more configuration values that indicate the configuration of the wireless access point identified in the access point identifier field.

* * * * *